Patented Mar. 31, 1925.

1,531,723

UNITED STATES PATENT OFFICE.

FREDERICK C. ALSDORF, OF COLUMBUS, OHIO.

PROCESS OF MANUFACTURING AND LAYING BITUMINOUS SHEET PAVEMENT.

No Drawing.  Application filed August 27, 1923. Serial No. 659,689.

*To all whom it may concern:*

Be it known that I, FREDERICK C. ALSDORF, citizen of the United States, residing at Columbus, in the county of Franklin and State of Ohio, have invented certain new and useful Improvements in Processes of Manufacturing and Laying Bituminous Sheet Pavements, of which the following is a specification.

This invention relates to a process of manufacturing and laying bituminous sheet pavements and materials therefor.

The primary object of the invention is to provide a process and composition which enables the pavement to be laid cold and when rolled will form a solid surface measuring up to all requirements of a penetration test.

A further object of the invention is to provide a material of the character stated which can be transported from place to place while cold and which will not form into a solid mass until placed on the pavement and rolled.

Usually in the manufacture and laying of bituminous road surface in which mineral aggregate is combined with a bituminous cementing material, aggregate and the cement are mixed in proper proportions, each in a heated condition and placed, and spread and compacted while still hot. This method requires the immediate use of the hot coated aggregate before it has cooled, since on cooling it becomes a mass which can not be separated and properly manipulated or spread if the original cementing material is of sufficient density or consistency to have a satisfactory cementing capacity.

In the practice of my process I take aggregate suitable for the construction of a bituminous concrete pavement or sheet asphalt pavement or a composition of mineral matter of different sizes as an aggregate for this purpose. The stone or mineral aggregate is heated and mixed with a suitable quantity of bituminous cementing medium also liquefied by heat, the mixture being effected by any suitable machinery or by hand. A portion of mineral aggregate may be mixed while cold with this heated mixture of aggregate and bitumen.

Instead of transporting this mixture and laying it while it still retains its heat I mix and knead the mixture while still warm either in the same machine in which the hot bitumen has been mixed with the aggregate or in a separate machine and may add a hydro-carbon solvent at this stage to make a more efficient product as regards adhesiveness and flexibility when finally laid on the road.

While kneading or mixing, the mixture is gradually cooled by the application of water in small quantities and is finally dropped into water to complete the cooling. The disintegration of the mixture may then be completed and the material placed in a stock pile or taken out and laid and rolled while cold. A sudden addition of cold water is detrimental to the success of the process as a hard crystalline product is thereby obtained which will not adhere or compact satisfactorily when cold. On the contrary if the mixture is kneaded while being gradually cooled a fine earthy material is produced which will compact satisfactorily when cold.

I claim as new the physical action which takes place in the mixture when kneaded while being cooled, either by air or water, and which results in a fine earthy texture in the finer constituents of the mixture as distinguished from the hard crystalline material obtained when the mixture is suddenly chilled by water.

It is to be understood that the invention is not to be limited to the particular materials and their proportions which are to be employed, but to give an example of the composition with suitable proportions which may be used to good advantage and one method of preparing this composition attention is called to the following:

|                  | Per cent. |
|------------------|-----------|
| Coarse aggregate | 40        |
| Sand             | 45        |
| Filler           | 8         |
| Asphalt          | 7         |

A portion of the above aggregate including the coarser sizes is heated to 300° F. and mixed in a pug mill with the asphalt heated to the same temperature. This mixture is then discharged and run through another pug mill mixer of a clay mixing type, where it is mixed with the remainder of the above aggregate which latter may be cold. At this stage I add one or two gallons of crude oil to the warm mixture, the kneading action of the pug mill mixer is continued and the mass gradually cooled with water and finally dropped into cold water first made muddy by application of clay at the end of the mixer where the disintegration is completed. The mixture is then ready to put in the stock pile or laid and rolled. The effect of the clay in the water is to keep the particles in the mixture from adhering when the mixture has dried as the particles are then coated with a fine thin covering of dry clay which acts to prevent their adherence until the mixture is rolled under pressure and placed on the highway.

It will be obvious that I may substitute for the crude oil above mentioned any desired hydro-carbon or bitumen solvent, such as water gas, coal tar or the like.

What is claimed is:—

1. The process of manufacturing bituminous paving material which consists in heating a stone or mineral aggregate and a bituminous cementing material, combining the same while hot, cooling the mixture by water, then kneading or further mixing the mixture while it is being cooled by the water.

2. The process of manufacturing bituminous paving material which consists in heating a stone or mineral aggregate and a bituminous cementing material, combining the same while hot, adding a small amount of a hydro-carbon solvent, cooling the mixture by water, then kneading or further mixing the mixture while it is being cooled by the water.

3. The process of manufacturing bituminous paving material which consists in heating a stone or mineral aggregate and a bituminous cementing material, combining the same while hot, then mixing the mass with another portion of cold aggregate, cooling the mixture by water, then kneading or further mixing the mixture while it is being cooled by the water.

4. The process of manufacturing bituminous paving material which consists in heating a stone or mineral aggregate and a bituminous cementing material, combining the same while hot, then mixing the mass with another cold portion of aggregate, adding a small amount of a hydro-carbon solvent, then kneading or further mixing the mixture while it is being cooled by water.

5. The process of manufacturing bituminous paving material which consists in mixing heated bitumen with a heated base, cooling the mixture by water, kneading or further mixing the mixture while being cooled with water and finally dropping the mixture in water which has been made muddy by the application of clay.

6. The process of manufacturing bituminous paving material which consists in mixing heated bitumen with a heated base, cooling the mixture by water kneading or further mixing the mixture while being cooled with the water and in mixing clay with said mixture during the cooling thereof with the water.

In testimony whereof I affix my signature.

FREDERICK C. ALSDORF.